US007286770B2

(12) United States Patent
Doyle et al.

(10) Patent No.: US 7,286,770 B2
(45) Date of Patent: Oct. 23, 2007

(54) FIBER OPTIC TRANSMISSION LINES ON AN SOC

(75) Inventors: Gary R. Doyle, Richmond, VT (US); Kenneth J. Goodnow, Essex, VT (US); Riyon W. Harding, Richmond, VT (US); Francis A. Kampf, Jeffersonville, VT (US); Jason M. Norman, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 10/604,410

(22) Filed: Jul. 18, 2003

(65) Prior Publication Data

US 2005/0013527 A1    Jan. 20, 2005

(51) Int. Cl.
*H04B 10/00* (2006.01)
(52) U.S. Cl. .................. 398/166; 398/164; 385/14
(58) Field of Classification Search .................. 385/14; 398/166, 164, 65
See application file for complete search history.

(56) References Cited

U.S. PATENT DOCUMENTS

| | | | |
|---|---|---|---|
| 4,744,623 A | | 5/1988 | Prucnal et al. |
| 4,797,879 A | * | 1/1989 | Habbab et al. ............... 398/51 |
| 5,148,504 A | * | 9/1992 | Levi et al. ..................... 385/14 |
| 5,200,631 A | * | 4/1993 | Austin et al. ............... 257/570 |
| 5,357,593 A | | 10/1994 | Bossler |
| 5,430,561 A | * | 7/1995 | Kato et al. .................. 349/202 |
| 5,502,785 A | | 3/1996 | Wang et al. |
| 5,757,658 A | * | 5/1998 | Rodman et al. ............. 716/10 |
| 5,946,116 A | * | 8/1999 | Wu et al. ..................... 398/55 |
| 6,081,527 A | * | 6/2000 | Chappel et al. ............. 370/394 |
| 6,145,024 A | * | 11/2000 | Maezawa et al. ............. 710/14 |
| 6,150,188 A | | 11/2000 | Geusic et al. |
| 6,169,833 B1 | | 1/2001 | Goossen et al. |

(Continued)

FOREIGN PATENT DOCUMENTS

DE    19918024    11/2000

(Continued)

OTHER PUBLICATIONS

Cliffs Quick Review Physics, 1994, Cliffs Notes, Inc. pp. 136-147.*

(Continued)

*Primary Examiner*—Jason Chan
*Assistant Examiner*—Danny Wai Lun Leung
(74) *Attorney, Agent, or Firm*—Schmeiser, Olsen & Watts; Anthony J. Canale

(57) ABSTRACT

Disclosed is an integrated circuit comprising a plurality of cores attached to at least one transmitter and receiver, an optical transmission network embedded within the wire levels of the integrated circuit, and wherein the transmitter and receivers send and receive data on the network. Also disclosed is a method of transmitting signals within an integrated circuit comprising an integrated circuit comprising a plurality of cores and optical paths, selecting an optical path from the plurality of optical paths for transmitting data, and transmitting the data on the selected optical path. Also disclosed is an integrated circuit comprising an optical transmission network, a plurality of cores, and a plurality of controllers, all three being operatively attached to each other.

8 Claims, 9 Drawing Sheets

U.S. PATENT DOCUMENTS

| | | |
|---|---|---|
| 6,233,376 B1 * | 5/2001 | Updegrove ................. 385/14 |
| 6,410,941 B1 | 6/2002 | Taylor et al. |
| 6,674,971 B1 * | 1/2004 | Boggess et al. ............ 398/139 |
| 2002/0031319 A1 | 3/2002 | Wang |
| 2002/0191916 A1 | 12/2002 | Frish et al. |
| 2004/0215929 A1 * | 10/2004 | Floyd et al. ................. 712/16 |

FOREIGN PATENT DOCUMENTS

| | | |
|---|---|---|
| WO | WO 0050946 | 8/2000 |

OTHER PUBLICATIONS

IBM Technical Disclosure Bulletin Balliet et al., vol. 26, No. 4, Sep. 1983, Optical Transmission System for Interconnecting Electronic Units, pp. 1793-1796.

* cited by examiner

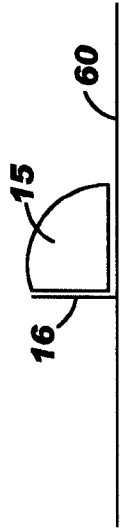
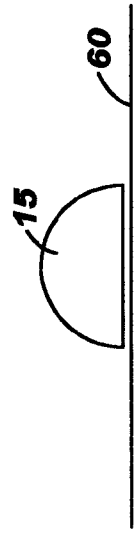
FIG. 7A
FIG. 7B
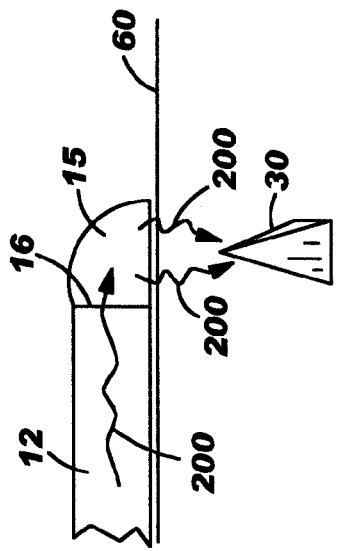
FIG. 7C
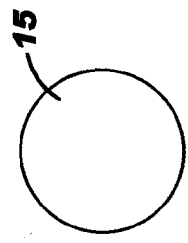
FIG. 6A
FIG. 6B
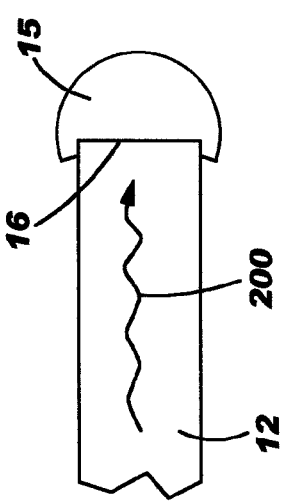
FIG. 6C

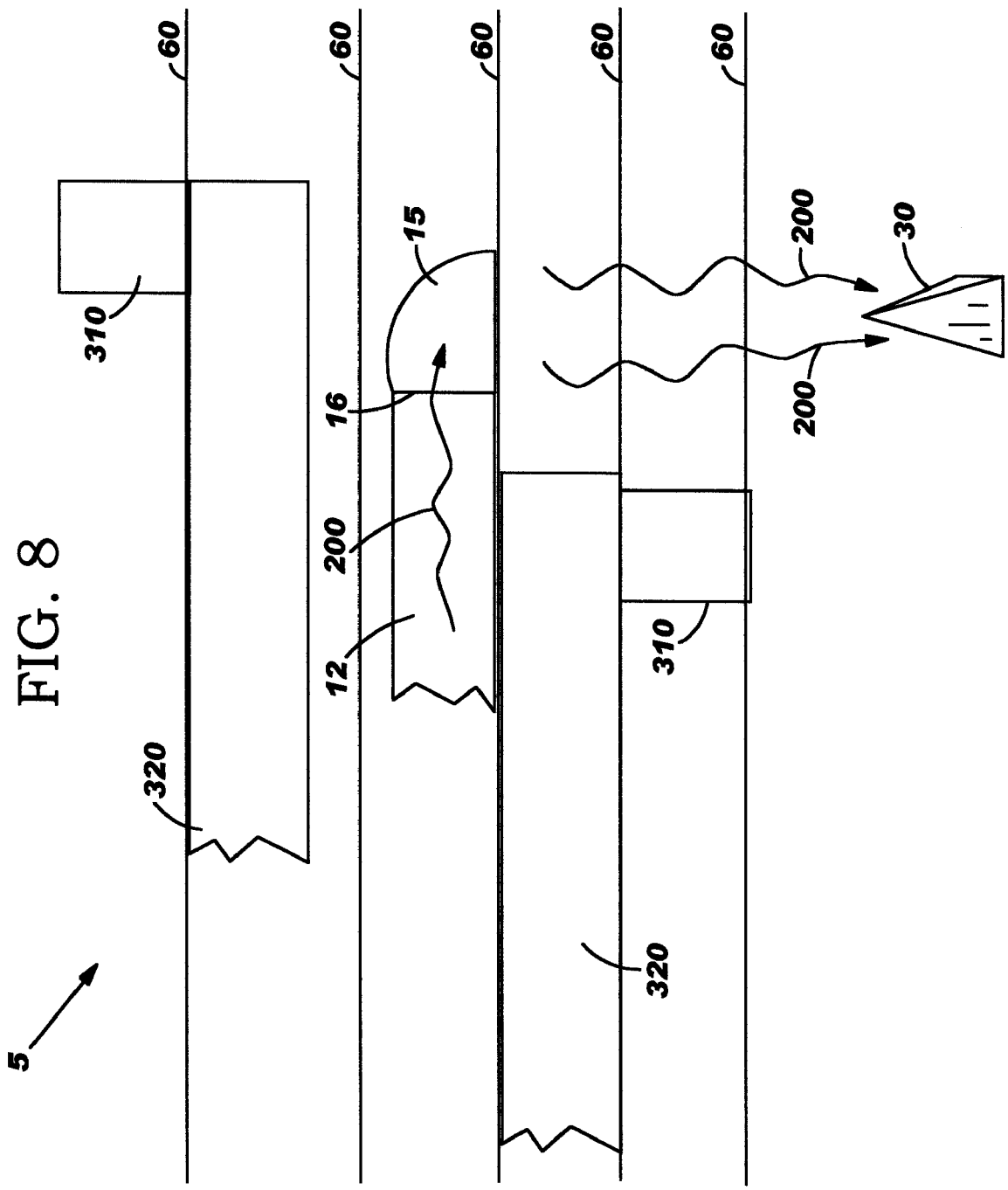

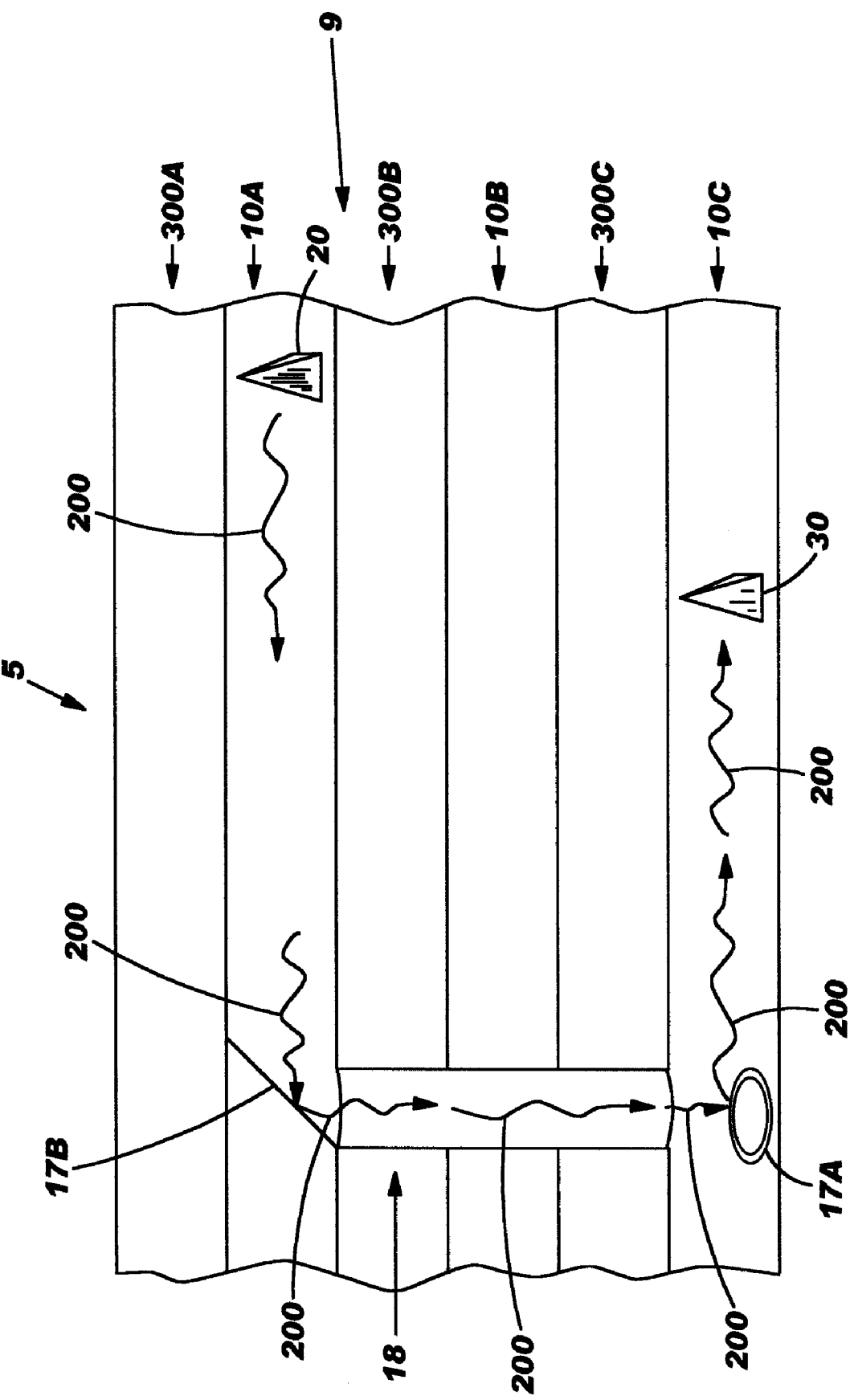

FIBER OPTIC TRANSMISSION LINES ON AN SOC

BACKGROUND OF INVENTION

FIELD OF INVENTION

This invention relates generally to using a fiber optic medium within a SOC (i.e., System On Chip) silicon dioxide layer of a chip to transmit light thereby serving as a signal transmission means within the chip.

BACKGROUND OF INVENTION

In the field of integrated circuit construction, in general, and in the construction of large ASIC's (i.e., Application Specific Integrated Circuit), in particular, the wiring distance between cores has become greater and greater as the space or paths to physically run the numerous wiring becomes more and more impinged upon due to overcrowding by additional cores. A resultant disadvantage is that latency problems occur wherein a signal fails to be latched onto the receiving core within the current clock cycle.

Accordingly, there is a need in the field of ASIC's for an improved way for communicating that overcomes the aforementioned, and other, disadvantages.

SUMMARY OF INVENTION

The present invention provides an integrated circuit using an optical transmission network and a method for transmitting data using the optical transmission network.

A first general aspect of the invention provides an integrated circuit comprising:

a plurality of cores operatively attached to at least one transmitter and at least one receiver;

an optical transmission network embedded within at least one wire level of the integrated circuit;

said at least one transmitter for sending data on said optical transmission network; and said at least one receiver for receiving data on said optical transmission network.

A second general aspect of the invention provides a method of transmitting signals within an integrated circuit comprising:

providing said integrated circuit, wherein said integrated circuit includes a plurality of cores and a plurality of optical paths;

selecting an optical path from said plurality of optical paths for transmission of data; and transmitting data on said selected optical path.

A third general aspect of the present invention provides an integrated circuit comprising:

an optical transmission network;

a plurality of cores operatively attached to said optical transmission network; and a plurality of controllers operatively attached to said optical transmission network and said plurality of cores.

The foregoing and other features of the invention will be apparent from the following more particular description of various embodiments of the invention.

BRIEF DESCRIPTION OF DRAWINGS

Some of the embodiments of this invention will be described in detail, with reference to the following figures, wherein like designations denote like members, wherein:

FIGS. 6A, 6B, 6C depict top views of various bumps, in accordance with an embodiment of the present invention;

FIGS. 7A, 7B, 7C depict side views of the corresponding views depicted in FIGS. 6A, 6B, 6C, respectively, in accordance with an embodiment of the present invention;

FIG. 8 depicts a larger side sectional view of FIG. 7C, in accordance with an embodiment of the present invention;

FIG. 10 depicts a side sectional close up view of a portion of a die employing some of the redirection terminations, in accordance with an embodiment of the present invention.

DETAILED DESCRIPTION

Figure 1A:
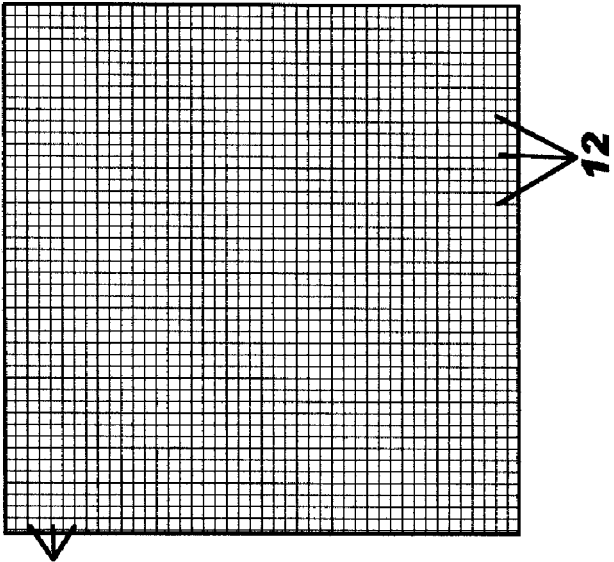
FIG. 1A depicts a top view of a fiber optic transmission layer, in accordance with an embodiment of the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. Although the drawings are intended to illustrate the present invention, the drawings are not necessarily drawn to scale.

The present invention provides for an improved integrated chip design.

General:

Integrated Chips (i.e., IC), as currently configured have several disadvantages. Integrated chips are getting more and more dense and more complex. The number of active circuits in a given area of the chip is increasing, as is the amount of connectivity of the integrated circuit. Studies have shown that as the number of vias connecting metal layers further increases, a point will be reached wherein the further adding of additional levels of metal connectivity layers will not, in turn, significantly increase the amount of connections because the new level of vias will not have available any connection path to the lower metal levels due to the previously open, available areas now being blocked by wires or vias. Current silicon is reaching a constraint of physical distance and RC load limits, where an alternative cross chip means of communication is desired. In sum, the IC, as currently configured, is heading to the point wherein eventually there will be no room at the IC.

The wiring in current IC's is a problem. Relatively speaking the wiring creates slow communication across a die. The requirement of using buffers, which effectively is part of the virtual wiring results in effective wiring delay.

A solution to this problem, as the present invention provides, is to use the oxide, which is currently silicon dioxide or glass, between the metal layers, as a transmission means for transmitting (i.e., sending and receiving) optical signals from one device to another. An optical transmission path would not necessarily be shaped, but instead use diffusion of light through the oxide medium to go from an optical transmitter to an optical receiver.

Thus, the present invention effectively is replacing the traditional wiring and buffers in the IC with optical fibers and cores. Amongst other resultant improvements, the cycle time is improved across the die. Other improvements include: no heat generation in the circuitry, little signal loss, communication without electrical noise, and the capability of having N number of channels for transmission.

Currently, vias substantially limit wireability as the number of metal layers increases (and therefore the number of vias increase too). In the present invention, however, by using an oxide plane for the optical signals, the transmitted light can diffuse around the existing vias. This ability in the present invention creates the added benefit of thereby allow for the further increase of the number of layers in an IC that can be used for traditional wiring.

Ultimately, the present invention creates a faster ASIC (i.e., Application Specific Integrated Circuit) that overcomes latency problems, a more powerful ASIC, and an ASIC with more functionalities.

Figure 1B:
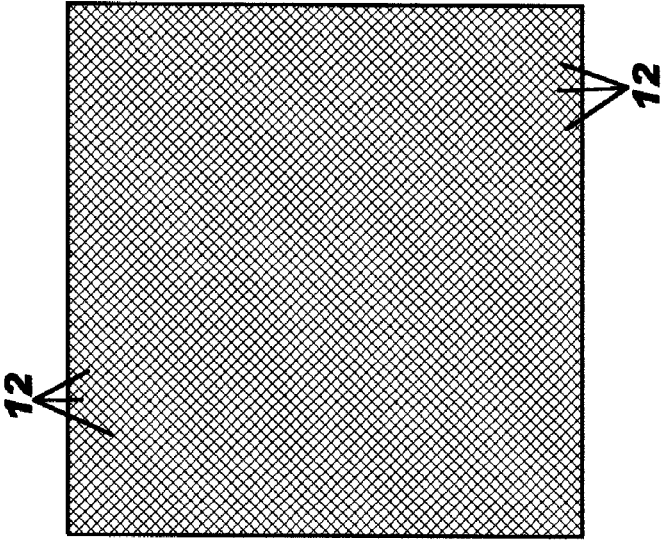
FIG. 1B depicts an alternative embodiment of the same view as FIG. 1A, in accordance with an embodiment of the present invention.
Figure 1C:
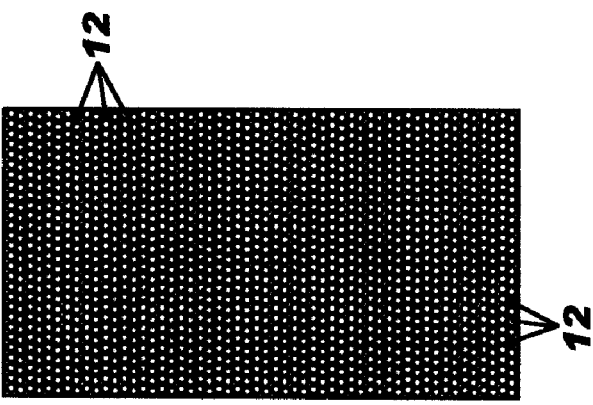
FIG. 1C depicts a third embodiment of the same view as FIG. 1A, in accordance with an embodiment of the present invention.

Specifics:

Turning to the enclosed figures, FIGS. 1A, 1B, and 1C depict top views of various embodiments of possibly layouts of a layer, or plane, of fiber optic channels, tunnels, or wires to be used within an ASIC. A fiber optic network 9 (See e.g., FIGS. 2, 10, 11), within an IC is made up of one, or more, layers, planes, or grids, denoted by a 10. Single fiber optic fibers 12 make up the grid 10. The fiber optic fibers 12 may be made of any suitable optical transmission medium, either typically now found in IC's or as an added or improved upon feature. For example, the fiber optic fibers 12 may be made of silicon dioxide, glass, etc. As FIGS. 1A, 1B. and 1C all indicate, the fibers 12 may be run in numerous configurations. For example, FIG. 1A and 1B show how the fibers 12 in grid 10 can be parallel or perpendicular to each other, or some combination of the two. FIG. 1C shows that the density of the fibers 12 within 10 can differ, as well, for in FIG. 1C the density of fibers 12 is much higher than in the embodiments in FIGS. 1A and 1B. It should be apparent to one skilled in the art, that there is virtually an infinite variety of grids 10 conceivable wherein the location, density, direction of the fibers 12 can differ and vary.

Figure 2A:
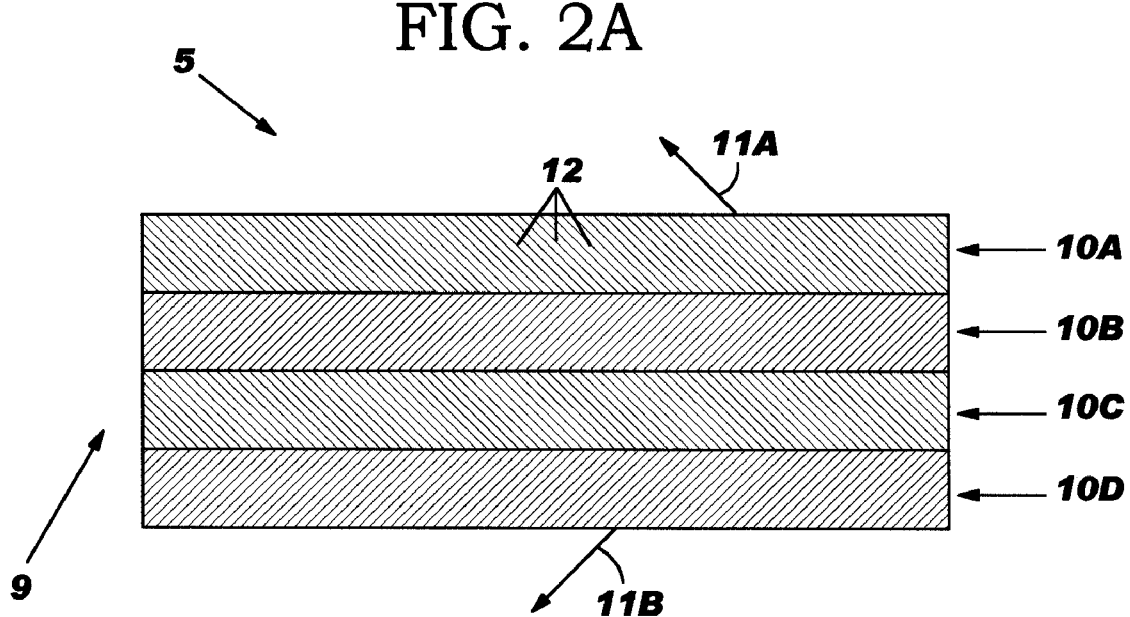
FIG. 2A depicts a side sectional view of die showing multiple fiber transmission layers, in accordance with an embodiment of the present invention.
Figure 2B:
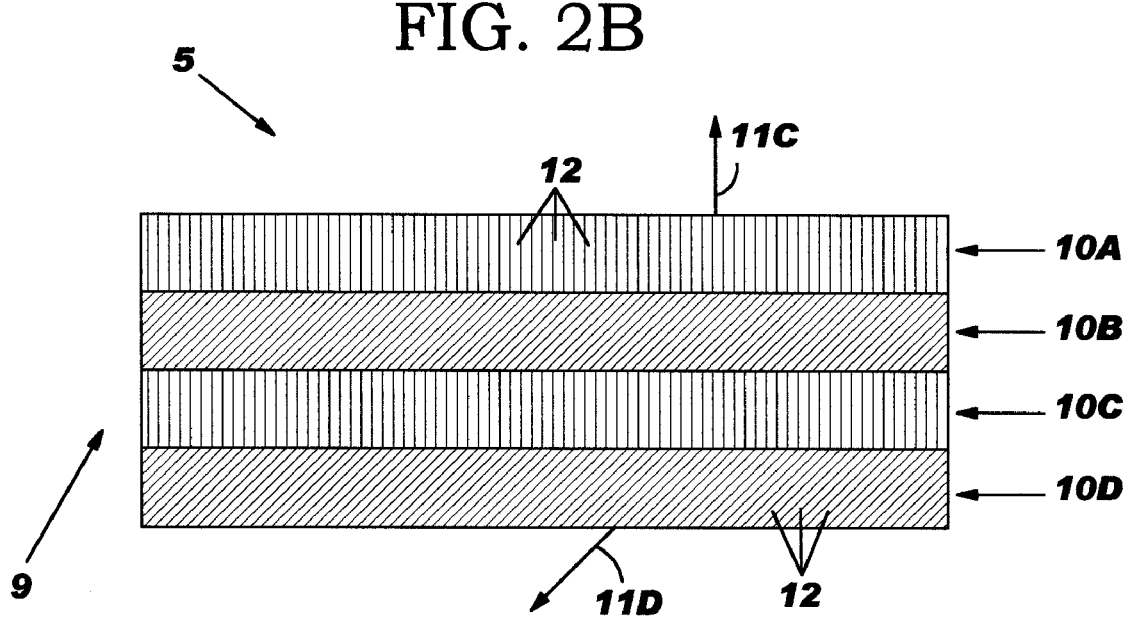
FIG. 2B depicts an alternative embodiment of the same view as FIG. 2A, in accordance with an embodiment of the present invention.

While FIGS. 1A, 1B. and 1C show a single layer, or plane, 10 of fibers 12, the fibers 12, in the present invention, can traverse across multiple layers within the ASIC, following an essentially vertical configuration, as well. For example, FIGS. 2A and 2B, depict side sectional views of portions of a die, or ASIC, 5. A fiber network comprises the plurality of fiber layers 10. As seen, the optical fibers 12 can traverse the various layers of the die 5 in a plurality of directions and configurations. For example, FIG. 2A shows a plurality of glass levels 10A, 10B, 10C, 10C made up of optical fibers 12. The glass fibers 12 run in a first direction in the top glass level 10A, as depicted by directional arrow 11A. Conversely, the optical fibers 12 in the bottom glass level 10C run in a second direction, as depicted by directional arrow 11B. Note that directional arrows 11A and 11B run in different directions. The angle between directional arrows 11A, 11B can be 90 degrees, acute, or obtuse. FIG. 2B shows sectional side view of a portion of a die, in this embodiment wherein the glass fibers 12 run in different directions in successive layers, and in the same direction in layers 10A, 10C, or in layers 10B, 10D. See, for example, directional arrows 11C, 11D for glass fibers 12 in layers 10A and 10D.

Figure 3:
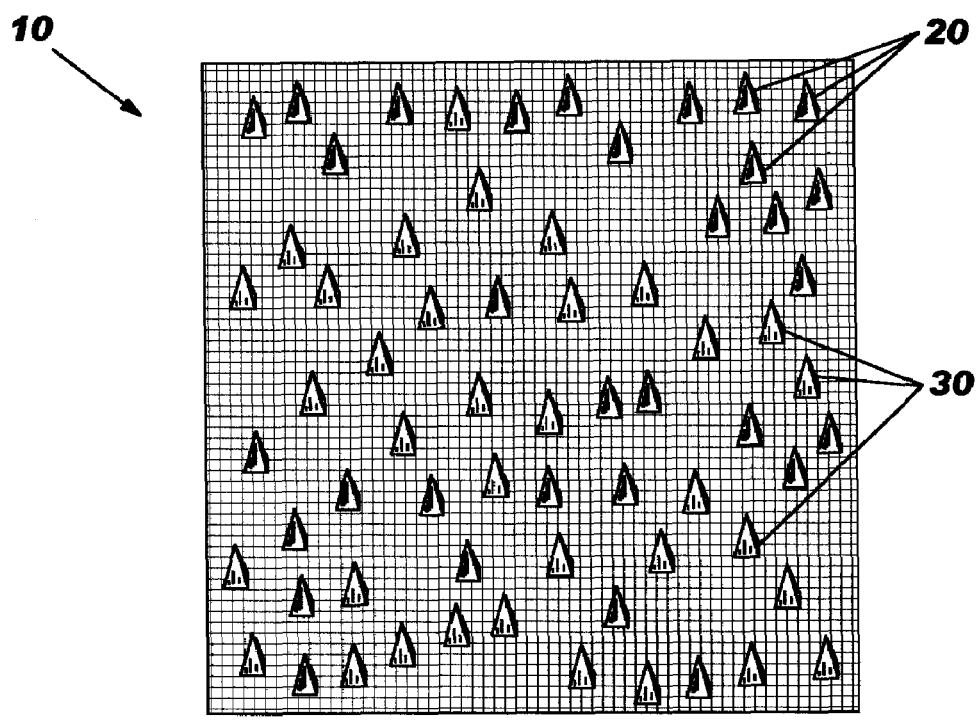
FIG. 3 depicts a schematic top view of a fiber transmission layer along with a plurality of transmitters and receivers connected thereto, in accordance with an embodiment of the present invention.

Turning to FIG. 3 which depicts a schematic top view of a portion of a die 5, showing one layer 10 of fibers 12 with associated elements. Located within the fiber layer, or plane 10 are a plurality of drivers 20, or optical transmitters, and optical receivers 30. The optical transmitters 20 and optical receivers 30 are coupled to the fiber layer 10 which is, in turn, connected to the other fiber layers 10 within the ASIC 5. A single fiber layer 10 (if there is only one fiber layer 10 within the ASIC 5) or the plurality of fiber layers 10 thus make up an entire fiber optic network 9 (not shown) within the ASIC 5. A plurality of local fiber optic controllers 40 (e.g., 40A, 40B, See FIG. 4) act as routers and arbiters between the fiber optic channels 10 and a plurality of cores 50 (See FIG. 4) within the ASIC 5. The term core 50 (See e.g., FIG. 4), as used herein, refers to a particular section of logic. The controllers 40 are responsible for choosing an optimal fiber optic channel 12 to reach the destination core 50. The controllers 40 can communicate with a single core 50, or a plurality of cores 50, as well as a pair of optical transmitters 20 and optical receivers 30. The controller 40, along with their respective optical transmitter 20 and optical receiver 30 can be located as needed on the ASIC 5. For example, a desired location for a particular controller 40 on the ASIC 5 would be where there is a greater need for latency-free communication between cores 50.

Figure 4:
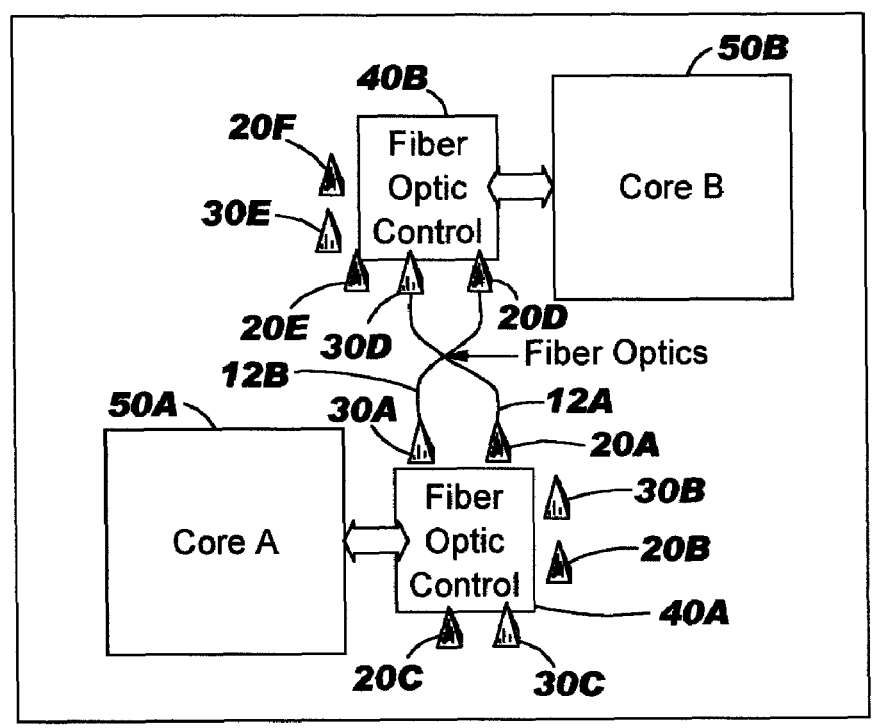
FIG. 4 depicts a functional diagram of a portion of a fiber optic network, in accordance with an embodiment of the present invention.

FIG. 4 shows a conceptual view of a particular portion of an ASIC 5 showing the communication via fiber optic lines 12 (e.g., 12A, 12B) between just two cores 50 (e.g., 50A, 50B), presuming that the two particular cores 50A, 50B in FIG. 4 need to communicate with each other. A first, or source core, 50A needs to read data from the second, or destination core 50B. Each core 50A, 50B have affiliated drivers 20, and receivers 30. For example, drivers 20D, 20E, 20F and receivers 30D, 30E are affiliated with core 50B. Conversely, drivers 20A, 20B, 20C and receivers 30A, 30B, 30C are affiliated with core 50A. During a first clock cycle, the first core 50A will send a read address, control and transfer qualifier bits to a local fiber optic controller 40A. The fiber optic controller 40A determines which fiber optic channel (12A or 12B) should be used for transmission to the desired destination core, namely the second core 50B. In FIG. 4 the controller 40A determines that fiber optic channel 12A shall be used for transmission. Various reasons that a controller 40 will select a particular fiber optic channel 12 over another fiber optic channel 12 include that one channel 12 may be defective, one channel 12 may have a different (e.g., shorter) length than other channels 12, etc. The fiber optic controller 40A then send the data to the appropriate transmitter, or driver 20, in this case driver 20A. The driver 20A, in turn, encodes the data for fiber optic transmission and drives the optical data packet through the fiber optic channel 12A specified by the controller 40A. The controller's 40A corresponding optical receiver 30, in this case specifically 30D, then decodes the returning handshake and lets the controller 40A know that the transmission of data was either successful or needs to be retransmitted. This reply back to the controller 40A is done from driver 20D back to receiver 30A, via fiber optic channel 12B. If the transfer was successful, the controller 40A sends a type of ACK (i.e., acknowledgment) signal back to the source core 50A. If, however, the transmission was unsuccessful, then the controller 40A can take steps to retry the transmission. If there is a collision in the attempted transmission, the controller 40A could choose a secondary fiber optic path 12 (not shown). If an error existed in the data itself or if the receiving core 50B was busy, the controller 40A could simply retry a transmission again.

Some additional features could be provided with the present invention. An error checking scheme could be included thereby allowing recovery of the sent data if there are collisions and/or incorrect transmissions. Additionally, there could be snoopers along the fiber optic network 10 which could decode addresses to ensure cache coherency. Also, features from traditional bus arbitration architecture could be added such as core abort mechanisms, timeout errors, and retry signals.

FIGS. 6A, 6B, and 6C show top views of a progression of the construction of an optical medium connection, in accordance with the present invention. FIGS. 7A,7B, and 7C show side views of the same corresponding constructs shown in FIGS. 6A-6C, respectively. In all six figures, on an oxide passivation surface 60 is attached a bump 15. In FIGS. 6B and 7B is shown a bump 15 which has been etched in half, thereby producing an etched face 16. As FIGS. 6C and 7C show a optical fiber 12 is connected to the etched face 16 of the bump 15. The light transmitted 200 is thus able to be sent along the optical fiber 12 and upon reaching the etched bump 15 turns vertically wherein the light 200 is able to be sent to other levels (not shown) and ultimately on to the optical detector circuit, specifically the receiver 30.

FIG. 8 shows a broader view of the detailed connection of FIGS. 6C and 7C and its relationship to a portion of an ASIC 5. Numerous Damascene wires 320 are connected to traditional (i.e., metal) vias 310 amongst the plurality of oxide passivation surfaces 60. As the present invention provides, and FIG. 8 indicates, light 200 transmitting along a fiber 12 from a transmitter 20 (not shown) through a bump 15 and on to receiver(s) 30. In so doing, however, the transmitted light 200 is able to readily avoid the various constructs such as the wires 320 and vias 310.

Figure 9C:
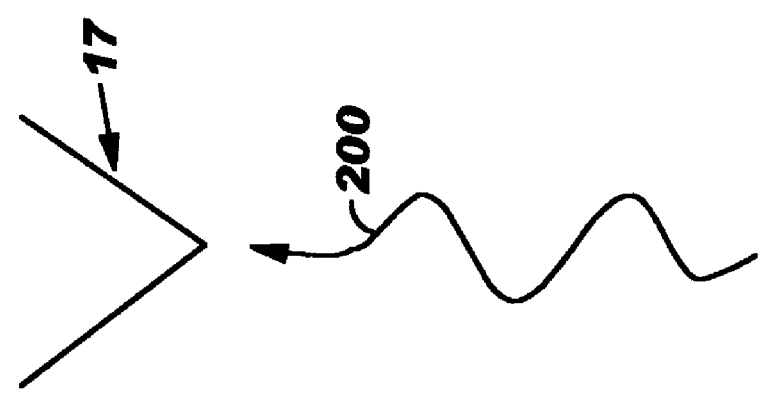
FIGS. 9A, 9B, and 9C depict various configurations of redirection terminations, in accordance with an embodiment of the present invention.
Figure 9B:
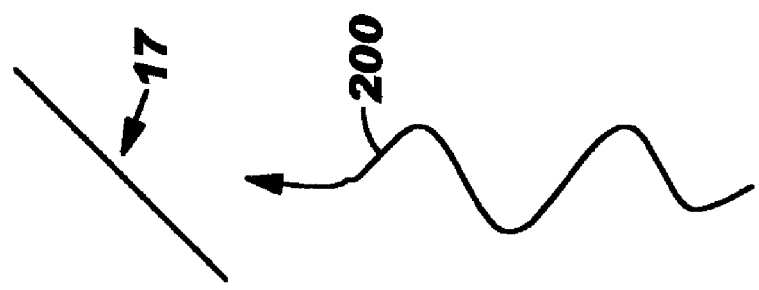
Figure 9A:
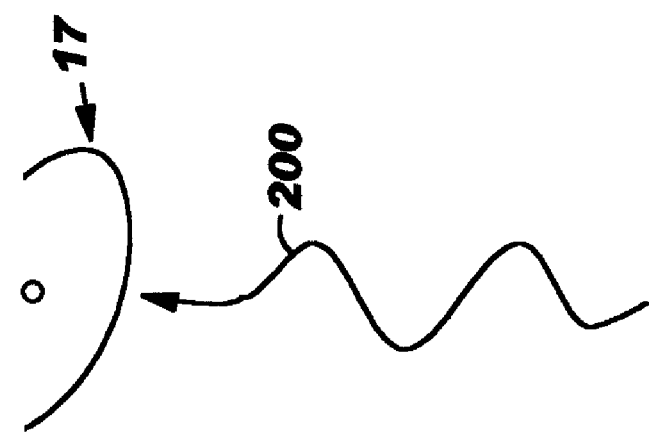

There is a need in the present invention for redirecting the transmitted light 200. One example of a location where this redirection occurs is when transmitted light 200 is required to leave a particular glass layer, or plane 10. Another example of this is when transmitted light 200 must turn, or be redirected, onto a particular, required glass layer 10. Thus, a redirection termination 17 acts much like a reflector of sorts. There are numerous shapes for redirection terminations 17, several depicted in FIGS. 9A, 9B, and 9C. The redirection terminations 17 which is made from a reflective material, such as metal, and is configured so as to produce, or allow, a reflection of the transmitted light 200 signal either onto or off of a light level 10. The redirection terminations 17 can be curved, or hemispherical (FIG. 9A), slanted (FIG. 9B), V or cone-shaped (FIG. 9C), or another suitable shape for redirecting the the light signal 200. The various redirection termination 17 configurations also offer an advantage of minimizing the transmit strength required for the light source.

FIG. 10 similarly shows a sectional side view of a portion of an ASIC 5 employing aspects of the present invention. The portion of the ASIC 5 shown has a plurality of metal layers 300A, 300B, 300C and a fiber optic network 9 comprised of a plurality of glass layers 10A, 10B, 10C interspersed amongst the metal layers 300A, 300B, 300C. A particular section of logic (i.e., core 50)(See e.g., FIG. 4) would contain an optical transmitter 20 (See e.g., FIG. 4) that can transmit light 200 within a particular glass layer 10A. Suppose a signal, in the form of transmitted light 200 is required to be sent from the transmitter 20 at the first glass layer 10A to a receiver 30 (See e.g., FIG. 4) on the third glass layer 10C. In order to redirect the transmitted light 200 from the first glass layer 10A to the third glass layer 10C a means must be created that allows the transmitted light 200 to be redirected, or reflected, out of the first glass layer 10A, then in the direction of the third glass layer 10C, and then onto the third glass layer 10C where the desired receiver 30 resides. Thus, a light path 18, with the use of a redirection termination(s) 17, provides the requisite redirectioning of light. This light path, although functionally similar to a metal via, is constructed from a material that allows for the transmission of light through it. Because this light path, or light via 18, can be constructed of the same material as the glass layers 10A, 10B, 10C, an added advantage of the invention is that the thermal contraction and expansion constants between the various glass layers 10A, 10B, 10C and the light via(s) 18 would be the same which prevents thermal stresses that would otherwise result from differential coefficient of thermal expansion under temperature-varying conditions.

Thus, as FIG. 10 depicts a light signal 200 could originate from a transmitter 20 on the first glass layer 10A. The transmitted light 200 would approach a redirection termination 17B (i.e., slant-shaped) causing the light 200 to be reflected out of the first glass layer 10A and along a light via 18. When the transmitted light 200 reaches the destination third glass layer 10C, the light 200 reflects off of a second redirection termination 17A (i.e., hemispherical-shaped). The transmitted light 200 then is appropriately transmitted along the third glass layer 10C to receiver 30. It should be apparent to one skilled in the art, that various shaped redirection termination 17A, 17B, 17C (See FIGS. 9A, 9B, 9C) can be used, as can a plurality of light vias 18.

Thus, optic transmitters 20 (See e.g., FIG. 4) can direct light signals 200 upwards (or downwards) onto a redirection termination, or dispersion device 17, wherein the redirection device 17 scatters the light across the optic plane 10. As a result, all receivers 30 (See e.g., FIG. 4) will be able to detect the transmission. The redirection device 17 can be spherical in shape in order to ensure even dispersal of the light. The receiver 30 can also utilize a lens for light gathering. In order to avoid interference from light reflections and to create signal attenuation, the base of the optic plane(s) 10 can be made, or coated, with a non-reflective material. Thus, the light-absorbing attribute of the base of the optic plane 10 will reduce the number of times a signal reflects around the optic plane 10.

An LED can be used as the optical transmitter 20. The selection of the particular type of LED used as the transmitter 20 affects the wavelength of the light signal 200. As a result, an embodiment can have multiple light signals of differing frequencies propagating simultaneously to multiple receivers 30 without impeding, or interfering, with each other. This can be done also all within a single oxide layer 10. For example, for each pair of cores 50 that wish to communicate with each other, there could be a separate wavelength of light for that particular pair of cores 50. As a result, the communication between two particular cores 50 would not require overhead for decoding or arbitration since the communication can flow freely between those two particular cores 50, while other light frequencies are being used by other cores 50.

For purposes of this invention, it should be noted that the frequencies of light that can transmitted through the optical fibers 12 in the present invention include electromagnetic waves in both the visual spectrum (i.e., about $3.8 \times 10^{14}$-$7.5 \times 10^4$ Hz) and infrared radiation (i.e., about $10^{11}$-$3.8 \times 10^4$ Hz). Thus, the term light, light signal, etc., as used in this disclosure includes both infrared radiation and visible spectrum electromagnetic radiation.

Figure 11:
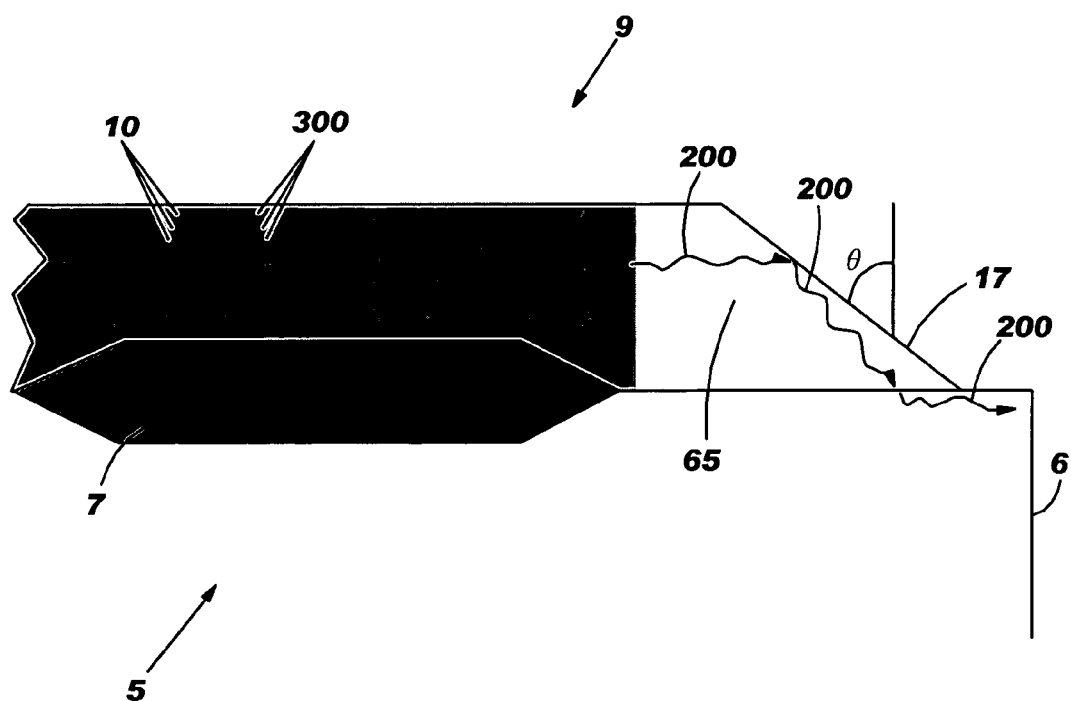
FIG. 11 depicts a side sectional close up view of an edge of a die, in accordance with an embodiment of the present invention.

In FIG. 11 shows an embodiment of an ASIC 5, detailing an edge of the passivation 65 of the ASIC 5, in accordance with the present invention. The feature shown in FIG. 11 indicates one way that the present invention will dump the photons from the various oxide levels 10 once the light signals 200 have been transmitted and received (i.e., used). The plurality of oxide levels 10 and metal levels 300 are shown above several active circuits 7 on the ASIC 5. Thus, the beveled oxide, or glass, edge 65 serves as a type of light sink, wherein the light signals 200 are absorbed, or dumped into the oxide edge 65 and/or ultimately off the edge 6 of the chip 5. An oxide edge 65 near the chip edge 6 is beveled at an angle, θ, to fully reflect the light 200 further down into the glass, or oxide edge 65. The angle of reflection, θ, will differ depending on the particular index of refraction of the material used in the oxide edge 65. In essence, this feature prevents the recirculation of light 200 back into the plurality of oxide layers 10 and metal layers 300 once the light has been transmitted and received appropriately by the transmitters 20 and receivers 30.

Figure 5:
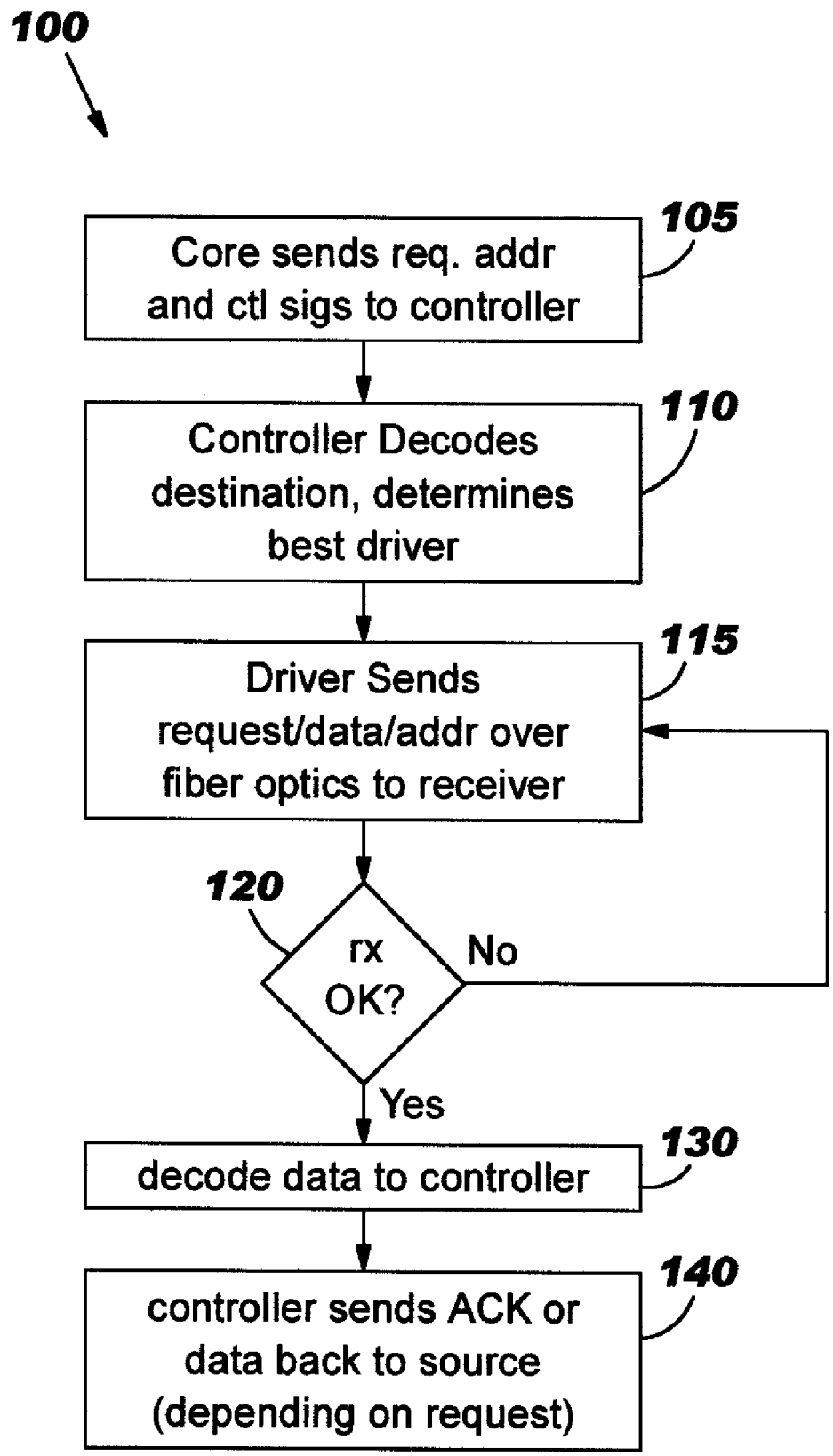
FIG. 5 depicts a flow chart of a communication method, in accordance with an embodiment of the present invention.

Communication Protocol:

FIG. 5 depicts a flow chart for a method for communicating using the present invention of transmitting data via a fiber optic medium 12 (See e.g., FIG. 4). The flow chart 100 starts with a sending step 105, wherein a sending, or source core 50 (See e.g., FIG. 4) sends a request with an address and control signals to its respective controller 40 (See e.g., FIG. 4). In the second step 110, the controller 40 both decodes the desired destination and determines the best driver, or optical transmitter 20 (See e.g., FIG. 4), on which to send the signals. Then in step 115, the driver 20 sends the request, data and address to a optical receiver 30 (See e.g., FIG. 4). At the decision step 120, a determination as to whether the receipt of the transmission sent in step 115 is made. If the receipt at the optical receiver 30 is not successful, then step 115 is re-executed. How-ever, if the transmission to the optical receiver 30 is successful, then step 130 is next executed. In step 130, data is decoded and sent on from the optical receiver 30 to destination controller 40. Upon receipt of the decoded data, the destination controller 40 sends in step 140 an acknowledgment (i.e., ACK), or data, depending on the request, back to the source.

The present invention can use a communication protocol that can consist of initiated pulse patterns such that the recipient device (i.e., core 50) would recognize its optical i.d., so that all subsequent communications would be received by that particular recipient core 50. The communication transmission could be terminated by a pulse gap, for example. Other communications schemes could be employed that use common media.

This communication protocol could be used from multiple transmitters 20 with multiple receivers 30 per glass layer 10 or separated by non-opaque regions on the same layer 10. The communication can be accomplished by using the same frequency of light while employing a collision protocol, or by using differing frequencies of light for tuned receivers 30. See e.g., FIG. 3. Another advantage of the present invention is that communication signals can send data packets with an I.D., control segments, and data segments all within the same packet; whereas previously data and control segments were sent separately. This results in more efficient communication transmission.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. An optical transmission method, comprising:
   performing a plurality of signal transmissions between cores of an integrated circuit, wherein each signal transmission is between two cores of a different pair of cores of the cores of the integrated circuit, wherein each signal transmission comprises a transmission of an optical signal in the visible or infrared portion of the electromagnetic spectrum at a wavelength that is specific to each different pair of cores and is a different wavelength for each different pair of cores and there is no overhead for decoding or arbitration in said preforming the signal transmissions that would otherwise exist if a same wavelength for the optical signals were permitted for pairs of cores of the different pairs of cores, said integrated circuit comprising:
   multiple layers comprising a plurality of glass layers and a plurality of metal layers in an alternating pattern such that the glass layers and the metal layers alternate in direct mechanical contact with respect to each other,
   a beveled edge adjacent to the multiple layers and oriented at an angle with respect to the multiple layers,
   a lower space below the multiple layers and below the beveled edge, said lower space bounded by a chip edge of the integrated circuit,
   the cores,
   an optic controller connected to each core,
   a plurality of optical transmitters connected to each core under control of the optic controller of each core such that each optical transmitter connected to each core is disposed within a glass layer of the plurality of glass layers,
   a plurality of optical receivers connected to each core under control of the optic controller of each core such that each optical receiver connected to each core is disposed within a glass layer of the plurality of glass layers, and
   a plurality of optical channels, each optical channel comprising optical fibers for transmission of optical signal and extending from one of the optical transmitters connected to one core of the cores to one of the optical receivers connected to another core of the cores,
   wherein each signal transmission is between an optical transmitter from one core of the cores to which a first optic controller is connected to an address of an optical receiver of another core of the cores to which a second optical controller is connected;

wherein performing each signal transmission comprises:
  decoding, by the first optic controller, the address;
  after said decoding, selecting an optical channel of the plurality of optical channels for subsequently transmitting an optical signal over the selected optical channel, wherein the selected optical channel extends from the optical transmitter of the one core and the optical receiver of the another core, and wherein said selecting is performed by the first optic controller;
  after said selecting, transmitting data from the first optic controller to the optical transmitter of the one core;
  encoding into optical data, by the optical transmitter of the one core, the transmitted data; and
  transmitting the optical signal comprising the optical data from the optical transmitter of the one core to the optical receiver of the another core via the selected optical channel;

wherein said performing the plurality of signal transmissions comprises performing a first signal transmission at a first wavelength in the visible or infrared portion of the electromagnetic spectrum and performing a second signal transmission at a second wavelength in the visible or infrared portion of the electromagnetic spectrum while the first signal transmission is being performed such that the second wavelength differs from the first wavelength;

wherein said performing the first signal transmission comprises transmitting a first optical signal from a first optical transmitter attached to a first core of said cores to a first optical receiver attached to a second core of said cores over a first optical channel of the plurality of optical channels;

wherein the first optical transmitter is disposed within a first glass layer of the plurality of glass layers and the first optical receiver is disposed within a second glass layer of the plurality of glass layers such that the first and second glass layers are different glass layers;

wherein the first optical channel comprises a first segment of the first glass layer, a second segment of the second glass layer, a first light via disposed between the first segment and the second segment, a first redirection termination disposed between the first segment and the light via and having a shape for causing the first optical signal propagating in the first segment to be diverted into the first light via to propagate in the first light via, and a second redirection termination disposed between the first light via and the second segment and having a shape for causing the first optical signal exiting from the first light via to be diverted into the second segment to propagate only in the second glass layer to the first receiver;

wherein the method further comprises after the first optical signal is received by the first optical receiver: directing photons of the first optical signal away from the multiple layers and into the beveled edge and totally reflecting the photons from the beveled edge into the lower space and out of the integrated circuit through the chip edge, said angle being sufficient for said totally reflecting to occur;

wherein optical fibers of the first glass layer, the second glass layer, and the first light via through which the first optical signal is transmitted consist of a same glass material;

wherein said performing the second signal transmission comprises transmitting a second optical signal from a second optical transmitter attached to a third core of said cores to each optical receiver of the plurality of optical receivers connected to a fourth core of said cores over a second optical channel of the plurality of optical channels;

wherein the second optical transmitter is disposed within a third glass layer of the plurality of glass layers and the plurality of optical receivers connected to the fourth core are disposed within different glass layers of the plurality of glass layers;

wherein the second optical channel comprises a third segment of the third glass layer, a second light via coupled to the third segment and extending to a fourth glass layer of the plurality of glass layers such that the third and fourth glass layers are different glass layers, a third redirection termination disposed between the third segment and the second light via and having a shape for causing the second optical signal propagating in the third segment to be diverted into the second light via to propagate in the second light via, and a fourth redirection termination disposed between the second light via and the fourth segment and having a spherical shape for causing the second optical signal exiting from the second light via to be dispersed so as to be detected by each optical receiver of the plurality of optical receivers connected to the fourth core.

2. The method of claim 1, wherein the first wavelength is in the visible portion of the electromagnetic spectrum, and wherein the second wavelength in the visible portion of the electromagnetic spectrum.

3. The method of claim 1, wherein the first wavelength is in the visible portion of the electromagnetic spectrum, and wherein the second wavelength in the infrared portion of the electromagnetic spectrum.

4. The method of claim 1, wherein the first wavelength is in the infrared portion of the electromagnetic spectrum, and wherein the second wavelength in the visible portion of the electromagnetic spectrum.

5. The method of claim 1, wherein the first wavelength is in the infrared portion of the electromagnetic spectrum, and wherein the second wavelength in the portion of the electromagnetic spectrum.

6. The method of claim 1, wherein a density of the optical fibers in the first glass layer differs from a density of the optical fibers in the second glass layer.

7. The method of claim 1, wherein the first glass layer is coated with a non-reflective material that is non-reflective with respect to the first optical signal.

8. The method of claim 1, wherein the first optical receiver uses a lens to gather the first optical signal.

* * * * *